Dec. 18, 1951 R. L. CARBREY 2,579,302

DECODER FOR PULSE CODE MODULATION

Filed Jan. 17, 1948 2 SHEETS—SHEET 1

INVENTOR
R. L. CARBREY
BY George C. Lord
ATTORNEY

Dec. 18, 1951 R. L. CARBREY 2,579,302

DECODER FOR PULSE CODE MODULATION

Filed Jan. 17, 1948 2 SHEETS—SHEET 2

INVENTOR
R. L. CARBREY
BY George C. Ford
ATTORNEY

Patented Dec. 18, 1951

2,579,302

UNITED STATES PATENT OFFICE 2,579,302

DECODER FOR PULSE CODE MODULATION

Robert L. Carbrey, Summit, N. J., assignor to Bell Telephone Laboratories, Incorporated, New York, N. Y., a corporation of New York Application January 17, 1948, Serial No. 2,824

12 Claims. (Cl. 250—27)

This invention relates to receivers for communication systems and more particularly to decoders for use in the receiving equipment of communication systems employing pulse code modulation.

In communication systems utilizing pulse code modulation, a speech wave or other signal to be transmitted is sampled periodically to ascertain its instantaneous amplitude. The measured instantaneous amplitude is expressed by pulse codes analogous to telegraph codes.

One code which conveniently may be employed in pulse code modulation involves permutations of a fixed number of code elements each of which may have any one of several conditions or values. An advantageous code of this type is the so-called binary code in which each of the fixed number of code elements may have either of two values. One way of representing these values is to represent one by a pulse sometimes referred to as an "on pulse" and the other by the absence of a pulse sometimes referred to as an "off pulse." Alternatively, one value may be represented by a positive pulse and the other by a negative pulse. The total number of permutations obtainable with the binary code is proportional to $2^n$ where $n$ is the number of code elements employed.

Because the total number of different amplitudes which may be represented by such a code of a fixed number of elements is limited, it is found desirable to divide the continuous range of amplitude values of which the transmitted signal is capable into a fixed number of constituent ranges which together encompass the total range. Each of these smaller or constituent amplitude ranges may then be treated as if it were a single amplitude instead of a range and is represented by an individual one of the permutations of the code. In the use of this method of code transmission the instantaneous amplitude ascertained by a sampling operation is represented by the respective permutation indicative of the amplitude range, or step, which most nearly approximates the amplitude of the measured sample. If, for example, the sample amplitude is nearest to that amplitude represented by the ninth step of the signal amplitude range the permutation code corresponding to range 9 is transmitted.

It will be observed that each code element in one of its values represents the presence in the sampled amplitude of a particular fixed portion of the total amplitude range, while in the other value it represents the absence of that same portion.

Once the signal to be transmitted has been encoded and sent in the form of a series of groups of code pulses to the receiving station the code groups must there be decoded and information obtained therefrom employed in the reconstruction of the original signal wave. In general, the operations to be performed at the receiving station include the weighting of each of the received code group pulses in accordance with the portion of the total complex wave amplitude which it represents, accumulation of such weighted pulses of each code group and the summation thereof to obtain an amplitude sample, which together with the amplitude samples obtained from successive code groups represents the original wave to be transmitted. Circuits for performing these operations have heretofore involved certain complications requiring either special types of vacuum tubes, relatively complex timing circuits or numerous storage and summing devices.

It is an object of the present invention to provide decoding equipment for pulse code modulation signals in which the weighting, collecting and summing operations are carried out in a single circuit.

It is a further object of the invention to provide a simple and efficient decoder for pulse code modulation.

In view of the above objects the invention involves the use of a feedback circuit as a decoder. This feedback circuit has a feedback factor of 2 (or 20 $\log_{10}2$ decibels) and a delay around the feedback loop equal to the interval between successive code element pulses of the code groups to be decoded. The feedback network employed in the decoder may include vacuum tubes and take the form of a feedback amplifier having either a net gain or net loss in the feedback loop depending upon the characteristics of the code groups employed to represent the signal amplitude or may comprise only passive elements such as attenuators or transmission lines.

The above and other features of the invention will be understood by reference to the following detailed specification taken with the drawings, in which.

Figure 1:
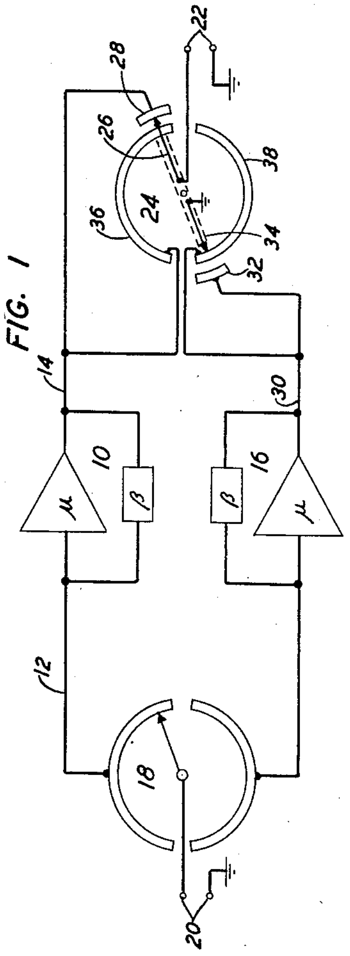
Fig. 1 is a schematic diagram of a decoding system according to the invention.

Fig. 1 illustrates diagrammatically one form of decoding system embodying the invention. For reasons which will appear below, duplicate decoding elements, each comprising a feedback circuit, and certain switching equipment shown as a pair of mechanical distributors are provided in the complete system. Considering the decoder in its simplest aspects, however, attention is directed to a single decoding element, as for example, feedback circuit 10 of Fig. 1. This circuit may comprise a linear feedback amplifier having a feedback factor, or $\mu\beta$ characteristic of 2 and a delay around the feedback loop equal to the pulse intervals of the code groups to be decoded.

Figure 2:
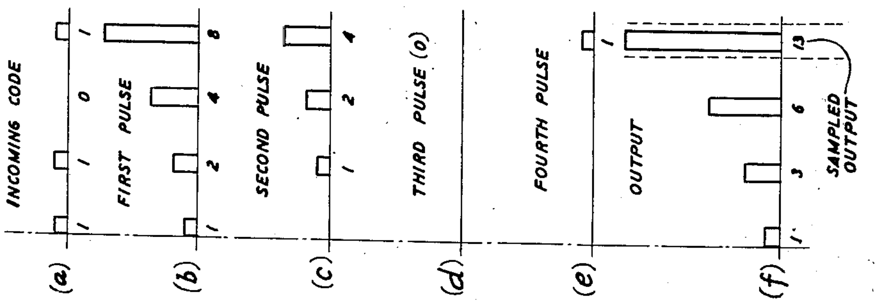
Fig. 2 is a series of graphs shown on a common time base illustrative of the operation of the decoder of Fig. 1.

Let it be assumed that a code group of a binary pulse code modulation system, as for example that shown in graph *a* of Fig. 2, is applied to the amplifier over lead 12, and that the code group pulses which are of substantially equal amplitudes are transmitted in descending denominational order. Thus in the code group of graph *a* the first pulse (from the left) represent the largest portion of the total amplitude and succeeding pulses represent successively smaller portions of the total amplitude. The pulses of the four denominational orders, taken from the left, may thus represent amplitudes of 0 or 8, 0 or 4, 0 or 2 and 0 or 1, respectively, depending upon whether "off" or "on" pulses are transmitted, and the code group shown in graph *a* represents an amplitude of 8+4+1 or 13 expressed in the decimal system of numeration.

Since the amplifier is assumed to be a linear device the effect of each of the code group pulses applied thereto may be considered separately and the total effect of the applied code group may be obtained by the summation at the end of the code group of the contributions from each applied pulse. When a pulse is applied over lead 12 to the input of the feedback amplifier, it will first appear at the output thereof with a given amplitude which will be taken as unity. After one complete circuit through the feedback loop it will again appear at the output, this time with an amplitude of 2 units. Because of the delay characteristic of the $\mu\beta$ path, the pulse completes its first circuit around the feedback loop and appears at the output after a delay equal to an interval between adjacent elements of the code group. This pulse of amplitude 2 then makes another trip around the loop and reappears at the output of the amplifier one code element interval later with an amplitude of 4 units and after still another trip around the loop, it appears at the output of the amplifier with an amplitude of 8 units. Thus, for each pulse applied to the input of the amplifier a series of pulses spaced by intervals equal to the code element intervals of the pulse code modulation groups appears at the output of the amplifier, these pulses having amplitudes which are related as 1, 2, 4, 8 . . . $2^n$.

The array of pulses appearing at the output of the amplifier in response to a single input pulse is shown in graph *b*, Fig. 2.

When the second pulse of the code group shown in graph *a* is applied to the input of the amplifier a similar array of pulses related in amplitude as increasing powers of two appears at the output thereof. The first pulse of this array reaches the output simultaneously with the reappearance at the output of the first code element pulse. The pulses of the second array which are shown in graph *c* of Fig. 2 occur in time positions corresponding to second, third and fourth pulses of the code group. Since the "on" pulses of a code group are of substantially equal amplitudes, the pulses appearing at the amplifier output in response to each applied pulse are measured in the same units. If severe distortion occurs in the radio transmission system between transmitter and receiver, it may be desirable to equalize the amplitudes of the input pulses by clipping before their application to the amplifier. A pulse regenerator for this purpose is indicated in the circuit modification of Fig. 5.

Since the third element of the code group chosen as an example is represented by an "off" pulse the output of the amplifier in response to this denominational order is zero as shown in graph *d* of Fig. 2. The fourth pulse of the code group is an "on" pulse and appears at the output of the amplifier with an amplitude of 1 at the conclusion of the interval allotted to the final denominational order of the code group.

Since the train of pulses appearing at the output of the amplifier in response to each of the applied pulses comprises individual pulses separated by intervals equal to the pulse intervals of the code group, the total amplitude of the output pulse from the amplifier at the conclusion of the period allotted to any denominational order is equal to the sum of the pulses corresponding to the contributions from the applied pulses of the code group. Thus, as shown in graph *f* of Fig. 2 the output of the amplifier at the completion of the first pulse period is 1, at the conclusion of a second it is 3, this being the contribution to the output from the first and second pulses as shown in graphs *b* and *c*. At the end of the period assigned to the third pulse period the total output is of amplitude 6, there having been no contribution from an input during the third pulse period and the output at the conclusion of the second denominational order having merely doubled. Finally, at the conclusion of the code group the output reaches an amplitude of 13 comprising contributions of 8 units due to the first pulse, 4 units due to the second and 1 unit to the fourth. It will be recognized that the amplitude 13 is the decimal representation of the binary number 1101 corresponding to the code group of graph *a* which was used as an example. If the output of the amplifier is sampled at the conclusion of the code group the output signal obtained will correspond to the sample amplitude which gave rise to the code group applied to the amplifier.

Since the amplifier employs positive feedback, it will eventually break into sustained oscillation if the process described above is allowed to continue indefinitely. Accordingly, it is necessary after the output has been sampled at the conclusion of a code group to block the amplifier to prevent oscillation and reset it for the decoding of a subsequent code group. Inasmuch as the code groups are advantageously sent in close succession it is convenient to employ a second feedback amplifier 16 identical in all respects to feedback amplifier 10 and to provide switching means, shown herein as a simple mechanical distributor 18, to apply successive code groups from input terminals 20 to amplifiers 10 and 16, alternately. Thus, while a first code group is being decoded in amplifier 10, amplifier 16 may be prepared to decode the second code group and while amplifier 16 is performing this operation, amplifier 10 may be blocked. Since it is necessary to connect the outputs of amplifiers 10 and 16 alternately to output terminals 22 and at the same time to block the amplifier which has just completed the decoding of a code group, a switching device shown schematically herein as a double arm rotary switch 24 may be employed. One arm 26 of the switch serves to connect each of the amplifiers to the output terminals at the conclusion of the code group which it decodes. For this purpose the output of amplifier 10 is applied over lead 14 to contact 28 while the output of amplifier 16 is applied over lead 30 to contact 32, contacts 28 and 32 being of such dimensions and so positioned that the circuit between the corresponding amplifier and the output terminals is completed only during the period allotted to the final denominational order of the code group.

The other arm 34 of the rotary switch is employed to connect the idle amplifier to ground thereby to suppress incipient oscillation. For this purpose leads 14 and 30 are connected to contact rings 36 and 38, respectively. These contact rings each extend over substantially one-half the circumference of the rotary switch and through the operation of arm 34 the amplifier which has just completed decoding a code group is grounded for substantially the entire duration of the succeeding code group while the ground connection is removed from the other amplifier which is thus made active for decoding.

The invention has been described and illustrated in Figs. 1 and 2 in its application as a decoder for code groups in which the code element pulses are transmitted in descending denominational order. The invention is equally applicable for use with code groups in which the code elements are sent in the opposite order; that is, code groups in the pulse first transmitted represents the smallest portion of the total amplitude and succeeding pulses represent successively larger amplitude portions. In this instance amplifiers 10 and 16, Fig. 1, differ from those considered above only in that the feedback loop has a negative instead of positive gain. In addition, the amplitude of the pulse first appearing at the output in response to any applied pulse is taken as the largest amplitude portion rather than the smallest; i. e., unity in the embodiment first described. Accordingly, the output of the amplifier in response to a single pulse applied to the input is a series of pulses of amplitudes related as descending powers of two. Assuming for purposes of illustration a code group of four elements, in which the first, second and third denominational orders are represented by "on" pulses and the fourth by an "off" pulse, the binary number corresponding thereto will be 0111. This number corresponds to the decimal number 7 and accordingly to an amplitude of 7 units. Considering the operation of the feedback amplifier with a net loss as a decoder therefore, pulses of a chosen amplitude will be applied to the input of the amplifier for each "on" pulse of the code group and the output of the amplifier after the pulses have made a single trip through the path will be taken arbitrarily as representing an amplitude of 8 units. Considering each pulse separately, the output of the amplifier in response to the first pulse of the illustrative code group comprises a series of pulses related as 8, 4, 2 and 1; the output of the amplifier in response to the second pulse corresponds to a series 8, 4, 2; the output in response to the third pulse comprises a series 8, 4 and there will be no output in response to the final pulse which is an "off" pulse. These series of output pulses may be represented as shown below in a fashion somewhat similar to that employed in the graphs of Fig. 2.

| | | | |
|---|---|---|---|
| 8 | 4 | 2 | 1 |
| | 8 | 4 | 2 |
| | | 8 | 4 |
| | | | 0 |
| | | | 7 |

Thus, if the output of the amplifier is sampled at the conclusion of the fourth pulse an amplitude of 7 will be obtained corresponding to the code group applied to the input.

Since oscillations can occur only when $\mu\beta \geqq 1$, it will be recognized that with a net loss in the feedback loop there is no possibility that the amplifier will break into oscillation. However, it is still desirable to ground the output of the amplifier at the conclusion of the sampling operation to discharge the circuit and prepare it for decoding another code group. Accordingly, it is desirable to employ two amplifiers and switching means as shown in Fig. 1 for the positive feedback decoder.

Figure 3:
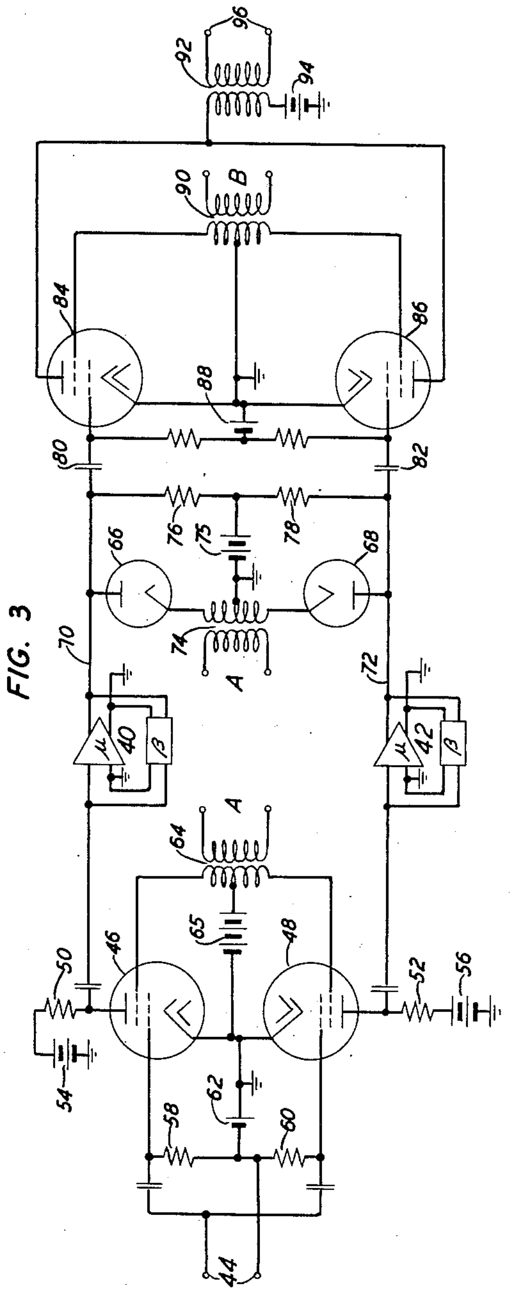
Fig. 3 is a schematic circuit diagram showing details of the decoder illustrated in the diagram of Fig. 1.

A detailed circuit diagram of a complete decoding system including equipment for performing the functions of rotary switches 18 and 24 of Fig. 1 is shown in Fig. 3. Referring to this diagram, feedback amplifiers 40 and 42 may be identical to those described above in circuit configuration, each having a $\mu\beta$ characteristic of 6.02 decibels, a gain or loss depending upon whether the code elements are transmitted in descending or ascending denominational order, and a time delay around the $\mu\beta$ loop equal to the pulse intervals of the code groups.

Figure 4:
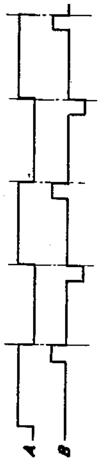
Fig. 4 is a graph showing on a common time base control waves required for the operation of the decoder of Fig. 3.

The code groups appearing at input terminals 44 are alternately to the inputs of amplifiers 40 and 42 by an electronic switch comprising vacuum tubes 46 and 48 and associated circuit elements. The cathodes of these tubes which may conveniently be tetrodes are connected together and to ground while the anodes are connected through anode resistors 50 and 52 to the positive terminals of batteries 54 and 56. The control grids of the two tubes are connected through the respective resistors 58 and 60 to the negative terminal of a bias battery 62 while the input signals are applied through blocking capacitors to the control grids. The screen grids are connected together and to the center-tapped secondary winding of a transformer 64 and the center tap is connected to the positive terminal of a battery 65 the negative terminal of which is grounded. A switching wave shown in graph A of Fig. 4 is applied to the primary winding of transformer 64 and is thus applied in push-pull to the screen grids. The negative bias applied by battery 62 to the control grids of the two tubes is of sufficient amplitude to prevent the flow of current through the tubes unless an "on" pulse is received from the transmitting station. The switching wave A is of sufficient amplitude to cut off one tube even in the presence of an "on" pulse on the control grid and to enable the other. During each half cycle of the switching wave, therefore, one tube may conduct if a positive pulse is applied to its control grid and the other tube is cut off. The switching wave has a period equal to twice the total length of the received code groups. Accordingly, the first tube 46, then tube 48 is enabled to transmit a code group appearing at terminals 44, applying the first code group to amplifier 40, the second group to amplifier 42, etc.

The functions of rotary switch 24 are performed by two sets of vacuum tubes and the equipment required for grounding the output of the inactive amplifier will be considered first. For this purpose diodes 66 and 68 are provided. The anodes of these diodes are connected to the output leads 70 and 72 of amplifiers 40 and 42, respectively, while their cathodes are connected together through the center-tapped winding of a transformer 74 to the primary winding of which is applied a switching wave A as shown in Fig. 4. This switching wave is identical to that applied to transformer 64 of the input switch. The center tap of the secondary winding of transformer 74 is grounded and the anodes of the two diodes are maintained at a positive potential in respect to ground by a battery 75 to which they are connected through resistors 76 and 78, respectively. During each half cycle of the control wave, the cathode of one diode is driven positively while that of the other is driven negatively. Accordingly, during the first half cycle of switching wave A, the cathode of diode 66 is made sufficiently positive to prevent the flow of current therethrough. At the same time current flows through diode 68 which in this condition represents a low impedance path from the output of amplifier 42 to ground. Recalling that during the first half cycle of switching wave A, switching tube 46 was enabled, it will be recognized that during this interval amplifier 40 is active to decode a received code group. At the same time diode 66 is rendered non-conductive removing the ground connection from the output of the amplifier.

Output leads 70 and 72 of amplifiers 40 and 42 are also connected through capacitors 80 and 82, respectively, to the control grids of a pair of vacuum tubes 84 and 86 having at least control and screen grids and arranged to operate as an electronic switch in response to pulses applied to the screen grids thereof. The cathodes of these vacuum tubes are connected together and to ground while the control grids thereof are connected through resistors to a negative bias battery 88, the bias voltage furnished by this battery being of value to allow the tubes to act as amplifiers during the appropriate switching pulses. The screen grids of these tubes are connected through the center-tapped secondary winding of a transformer 90, the center tap being connected to ground. A switching wave shown in graph B of Fig. 4 is applied to the primary winding of transformer 90. It will be noted that this switching wave comprises a series of short pulses of alternate polarity occurring during the final portions of the half cycles of switching wave A. Thus during the final portion of the first half cycle of switching wave A, a pulse is applied to transformer 90 in the proper polarity to render the screen grid of tube 84 sufficiently positive and permit the flow of current therethrough. During the second half cycle of switching wave B the screen grid of switching tube 86 is rendered sufficiently positive to permit flow of current therethrough. Accordingly, switching tubes 84 and 86 are alternately rendered conductive to sample the output of amplifiers 40 and 42 at the conclusion of the periods during which these amplifiers are respectively active for decoding code groups. The anodes of switching tubes 84 and 86 are connected together and through the primary winding of a transformer 92 to a source of positive potential shown herein as a battery 94. The sample amplitude pulses appearing alternately at the anodes of switching tubes 84 and 86 thus appear successively at the output terminals 96 of the decoder.

Figure 5:
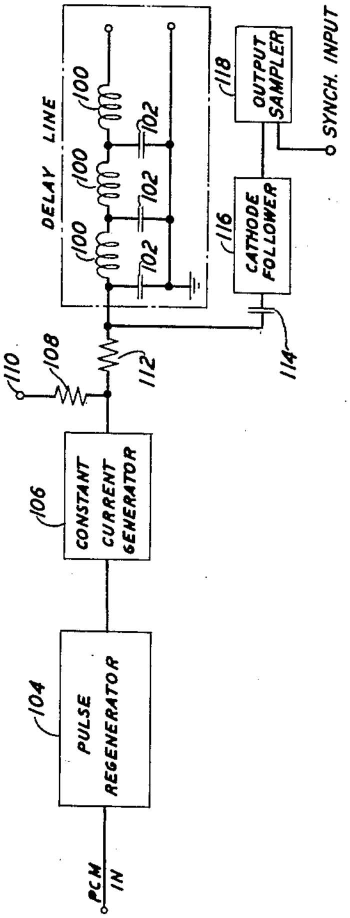
Fig. 5 is a schematic diagram of a decoder in accordance with the invention which includes only passive elements in the decoding circuit.

The invention may also be embodied in a decoder in which only passive elements are employed in the decoding network. Such a decoder is illustrated in Fig. 5 of the drawings. Here the feedback network comprises a delay line of electrical length equal to one-half the pulse interval of the code groups to be decoded. The code pulses are applied to one end of the delay line, travel the length thereof in one-half the code pulse interval and are reflected back to the input to arrive thereat simultaneously with the occurrence of the code pulse in the next succeeding code pulse interval. This delay line may be terminated in various ways, for example, the far end of the line may be open circuited providing a complete reflection, while the input end of the line is so terminated that one-half the pulse reflected from the open end is absorbed in the termination and the other half is reflected back into the line. Alternatively, the far end of the line may be terminated to produce reflection of one-half of any pulse arriving from the input end of the line. Other arrangements in which the loss of the line is produced partially at one end and partially at the other may also be employed.

In the embodiment illustrated in Fig. 5 the delay line is indicated as made up of a plurality of sections each comprising a series inductor 100 and a shunt capacitor 102. The lower terminals of the shunt capacitors are connected together and to ground. Where the frequencies employed are suitable, a practical delay line may comprise a solid dielectric cable of the proper length. The code group pulses received from the transmitter of the system are applied to a pulse regenerating unit 104 employing conventional clipping and limiting amplifiers or equivalent circuits to reshape the pulses so that output pulses of equal length and equal amplitude are produced at the output of unit 104 in response to all the "on" pulse of the received code groups. These pulses are applied to control a constant current generator 106 which in the presence of an "on" pulse draws a constant current through resistor 108 from a source connected to terminal 110. The pulses produced by the constant current generator are applied through resistor 112 to the input of the delay line.

Thus for each code element pulse a pulse of amplitude which may be designated as A is sent down the delay line. After an interval equal to one-half the pulse interval of the code group this pulse reaches the open circuited end of the line and is completely reflected arriving at the input end of the line at the moment at which the next succeeding pulse of the code group is applied thereto. The termination of the input end of the line comprising resistors 108 and 112 is so proportioned that one-half of the pulse returning to the input of the line is absorbed and the other half is reflected back into the line. Thus after one complete round trip in the delay line the pulse originally applied thereto has an amplitude equal to A/2 and as in the case of the decoder previously described this pulse will appear at the input of the delay line after successive code element intervals with amplitudes equal respectively to A/2, A/4, etc. Pulses applied to the input of the delay line in succeeding code element intervals will be similarly attenuated. At the completion of the code group the sum of the contributions from the several attenuated pulses plus the last pulse to be applied will be equal to the amplitude represented by the code group. This summation pulse is applied through a blocking capacitor 114 to a cathode-follower stage 116 from which it is applied to an output circuit 118 which may conveniently include a sampling circuit analogous to that of Fig. 3 and the low-pass filter necessary to eliminate the code group frequency from the output signals and provide an output representative of the original signal wave.

What is claimed is:

1. In a system for decoding code groups of pulses based on a system of numeration of radix $r$, the pulses occurring at equal intervals and each pulse representing a portion of the amplitude of a signal wave, a feedback network having a loop transmission characteristic of 20 $\log_{10} r$ decibels and a delay around the loop equal to the interval between said pulses, means for applying the pulses of a code group to said network and means for sampling the output of the network at the conclusion of the code group.

2. In a system for decoding groups of $m$-valued pulses occurring at equal intervals, each pulse representing a portion of the amplitude of a signal wave, a feedback network having a loop transmission characteristic of $m$ and a feedback delay equal to the interval between said pulses, means for applying the code group pulses to said network and means for sampling the output of the network at the conclusion of the code group.

3. In a system for decoding code groups of bi-valued pulses occurring at equal intervals, each pulse in one value representing a portion of the amplitude of a signal wave, a feedback network having a loop transmission characteristic of two and a delay around the loop equal to the interval between said pulses, means for applying a pulse to said network in response to each code group pulse of said one value and means for sampling the output of the network at the conclusion of a code group.

4. In a system for decoding code groups of bi-valued pulses occurring at equal intervals, each pulse in one value representing a portion of the amplitude of a signal wave, a feedback amplifier having a feedback factor of 20 $\log_{10} 2$ decibels and a delay around the feedback loop equal to the intervals between said pulses, means for applying a pulse to said amplifier in response to each code group pulse of said one value and means for sampling the output of the amplifier at the conclusion of a code group.

5. In a system for decoding code groups of bi-valued pulses occurring at equal intervals, each pulse in one value representing a portion of the amplitude of a signal wave and the pulses being transmitted in descending denominational order a positive feedback amplifier having a $\mu\beta$ gain of two and a delay around the $\mu\beta$ loop equal to the intervals between said pulses, means for applying a pulse to said amplifier in response to each code group pulse of said one value and means for sampling the output of said amplifier at the conclusion of said code group.

6. In a system for decoding code groups of bi-valued pulses occurring at equal intervals, each pulse in one value representing a portion of the amplitude of a signal wave and the pulses being transmitted in ascending denominational order, a feedback circuit having a $\mu\beta$ loss of 20 $\log_{10} 2$ decibels and a delay around the $\mu\beta$ loop equal to the intervals between said pulses, means for applying a pulse to said circuit in response to each code group pulse of said one value and means for sampling the output of said amplifier at the conclusion of said code group.

7. In a system for decoding successive code groups of bi-valued pulses occurring at equal intervals, each pulse of one value representing a portion of the amplitude of a signal wave, a plurality of feedback amplifiers each having a $\mu\beta$ characteristic of 6.02 decibels and a delay around the $\mu\beta$ loop equal to the interval between said pulses, switching means for applying successive code groups of pulses to the inputs of said plurality of amplifiers in turn and additional switching means for connecting the output of each of said amplifiers in turn to a sampling device effective to sample the connected output at the conclusion of a code group, said switching device being synchronized with the first.

8. In a system for decoding code groups of bi-valued pulses at equal intervals, each pulse of one value representing a portion of the amplitude of a signal wave, a pair of feedback amplifiers each having a $\mu\beta$ characteristic of 6.02 decibels and a delay around the $\mu\beta$ loop equal to the interval between said pulses, means for applying the pulses of said successive code groups alternately to the inputs of said amplifiers, switching means synchronized with said last-mentioned means for sampling the output of each amplifier at the conclusion of each code group of pulses applied thereto and means for squelching each amplifier during the interval in which the other amplifier is active.

9. In a system for decoding code groups of bi-valued pulses at equal intervals, each pulse of one value representing a portion of the amplitude of a signal wave, a pair of feedback amplifiers each having a $\mu\beta$ characteristic of 20 $\log_{10} 2$ decibels and a delay around the $\mu\beta$ loop equal to the interval between said pulses, means for applying the pulses of said successive code groups alternately to the inputs of said amplifiers, switching means synchronized with said last-mentioned means for sampling the output of each amplifier at the conclusion of each code group of pulses applied thereto and means connecting the output of each amplifier to ground during the interval in which the other amplifier is active.

10. In a system for decoding code groups of $m$ valued pulses occurring at equal intervals each pulse representing a portion of the amplitude of a signal wave, a feedback network comprising a delay line of electrical length equal to one-half the pulse interval of said code groups, said delay line being terminated to reflect all of the incident energy at one end and one-half the incident energy at the other end, means for applying the code group pulses to one end of the delay line and means for sampling the total energy present at that end of the delay line at the completion of the code group.

11. In a system for decoding code groups of $m$ valued pulses occurring at equal intervals each pulse representing a portion of the amplitude of a signal wave, a delay line of electrical length equal to one-half the pulse interval of said code group, one end of the delay line being open circuited and the other terminated to provide reflection of one-half the energy incident thereupon, means for applying the pulses of code groups to be decoded to the last mentioned end of said delay line and means for sampling the total amount of energy present at that end of the delay line at the completion of a code group.

12. In a system for decoding code groups of bi-valued pulses occurring at equal intervals, each pulse representing in one value a portion of the amplitude of a signal wave, a feedback network having a loop transmission characteristic of 2 and a delay around the loop equal to the interval between said pulses, means for applying equal pulses to said network in response to each code group pulse of said one value and means for sampling the output of the network at the completion of a code group.

ROBERT L. CARBREY.

REFERENCES CITED

The following references are of record in the file of this patent:

UNITED STATES PATENTS

| Number | Name | Date |
|---|---|---|
| 2,188,970 | Wilson | Feb. 6, 1940 |
| 2,255,839 | Wilson | Sept. 16, 1941 |
| 2,412,995 | Levy | Dec. 24, 1946 |
| 2,429,227 | Herbst | Oct. 21, 1947 |
| 2,487,995 | Tucker | Nov. 15, 1949 |